Sept. 29, 1959   R. H. LEHTOLA   2,906,306
PORTABLE DEBARKING APPARATUS
Filed Oct. 19, 1956   2 Sheets-Sheet 1
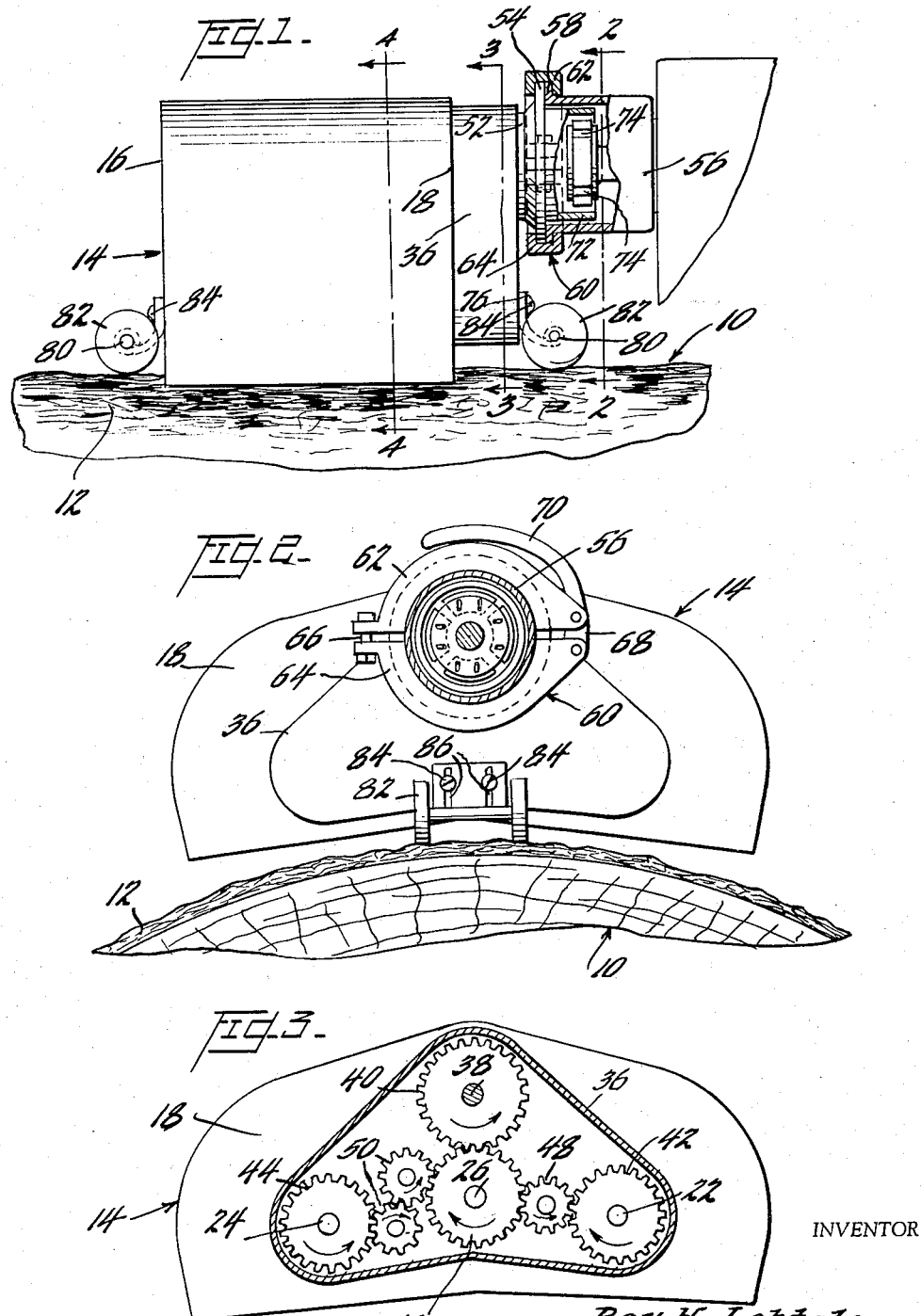
INVENTOR
Ray H. Lehtola,
BY
ATTORNEYS

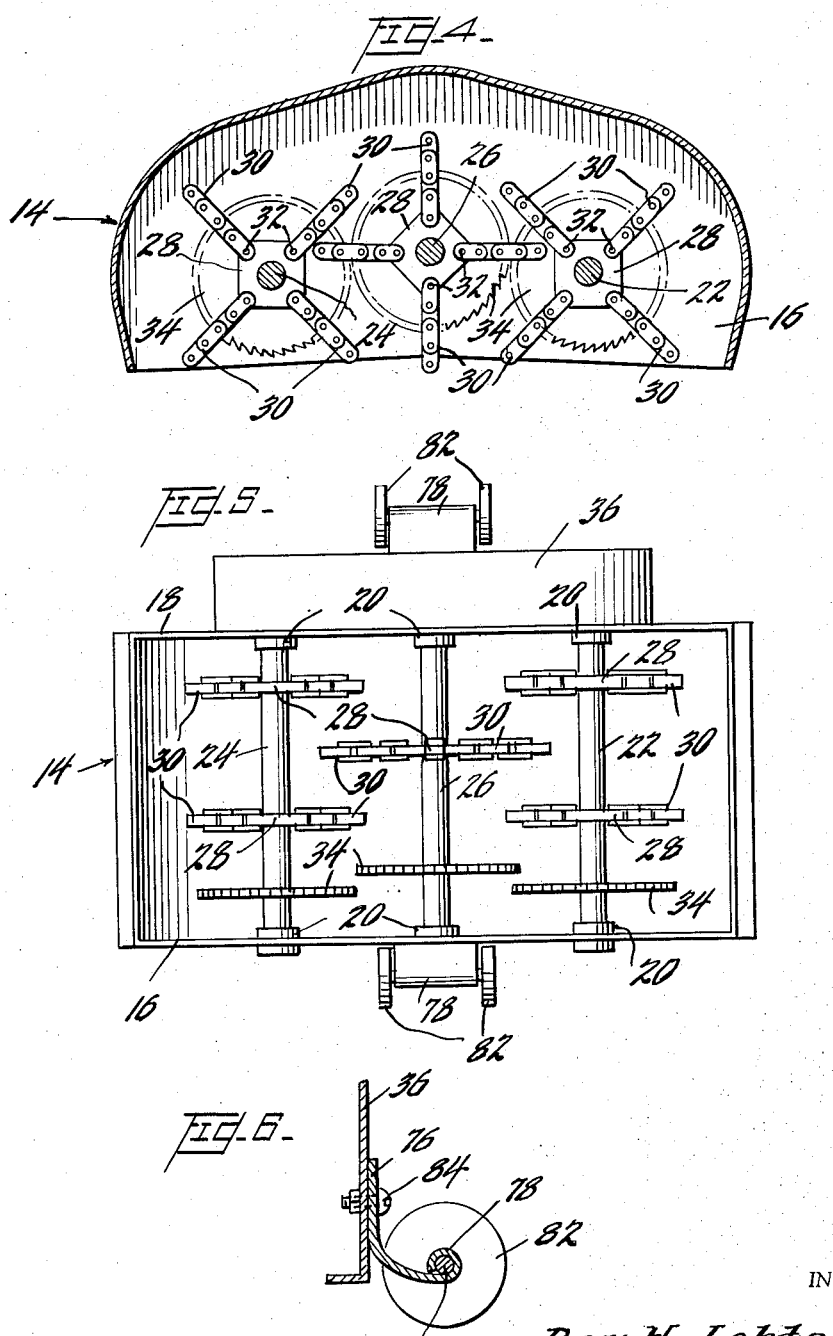

United States Patent Office 2,906,306
Patented Sept. 29, 1959

2,906,306

PORTABLE DEBARKING APPARATUS

Ray H. Lehtola, Hancock, Mich.

Application October 19, 1956, Serial No. 617,156

3 Claims. (Cl. 144—208)

This invention relates to a portable log peeler.

It is common practice to peel or debark logs for sawmill use and it is imperative that they be debarked for pulpwood use. Except for certain selected species, bark itself has very little utility save for fuel. Its presence on the slabs, first sawn from logs, rarely is advantageous and frequently is detrimental. Traces of bark attached to wood chips used for paper pulp have a materially deteriorating effect upon the quality of the paper produced from the pulp. It is therefore desirable to effectively remove the bark from logs, prior to their processing in lumber and pulp mills.

This has long been recognized and highly efficient devices have been installed for this purpose in many mills. However, these devices are relatively large and represent a substantial investment of capital. These devices are so large as to virtually require a separate building to house them. The result is that the logs must be brought to the debarking apparatus for treatment so that there is accumulated at the point of treatment, all of the bark that is removed. It must then be carried away again or, more frequently, it is burned.

Obviously, such installations are only suited to the daily processing of large quantities of logs. It would be desirable to remove the bark at or near the point where the trees are felled but, for equally obvious reasons, this cannot be carried on with the large apparatus used most widely. Removal of the bark at the point where the logs are cut enables the bark to be returned to the soil that produced it. There is no problem of disposing of the bark at the mill and the peeled logs are more salable for several reasons that need not be gone into.

A so-called portable debarking apparatus has been produced but even it is relatively large, requiring an entire truck to transport it. Supplying the power requirements for such a device is not simple in the woods and the operation of the device is uneconomical on any but large-scale cutting. Since much pulpwood cutting is done by farmers during relatively inactive winter periods, what is needed is a truly portable device that can be carried into the woods to be used at the point of felling. It is also obvious that such a device must be relatively light and inexpensive so that it may be used economically by one or two men.

I have devised an apparatus meeting these requirements. It also has the advantage that, besides being economical in its use of power, it takes advantage of a source of power now widely available in the wood-cutting country. In this way, the power drive being already available, the only expense involved is the peeling apparatus itself.

My invention can best be understood by reference to the accompanying drawings wherein a preferred embodiment of the device is shown in the drawings:

Figure 1 is a front elevation, partly in section, of the device in operative position upon a log;

Figure 2 shows a vertical transverse section as viewed along the line 2—2 of Figure 1, the device being also shown in operative position in this figure;

Figure 3 is another vertical transverse section, looking along the line 3—3 of Figure 1;

Figure 4 is still another and similar section looking along line 4—4 of Figure 1;

Figure 5 is a partial bottom view, showing the internal structure of the apparatus; and Figure 6 is a detail section, showing the means for positioning the device on a log.

In Figures 1 and 2, the invention is shown in operative position upon a log 10 having an outer layer of bark 12. The operative elements of the invention are located within a hoodlike housing 14 that is open on the bottom adjacent the log that is being stripped.

The end walls 16 and 18 of the housing support bearings 20 for three shafts 22, 24 and 26. Fixed to these shafts are a number of flexible elements which, when the shafts are rotated, will tend to stand straight out from the shaft, being sustained by centrifugal force. I prefer to mount a number of hubs 28 upon the shafts and to fasten short lengths of block chain 30 to the hubs by means of pins 32. As is well understood in the art of mechanically peeling logs, ordinary round link chain or lengths of wire cable may be used instead of block chain as shown. Some changes would be necessary in such case, in the mounting of the flexible elements, according to the particular type of element chosen. It will also be obvious that the chain should be in a state of substantial dynamic balance in order to minimize the wear upon the bearings.

When the shafts are rotated, in a manner to be subsequently disclosed, it will be obvious that the free end of each chain 30 will have a flail-like action upon objects located at the path of travel of the end of the chain. Tree bark has a relatively weak transverse strength compared to its longitudinal strength so that when my invention is placed upon a log in the manner shown by Figures 1 and 2 and the shafts rotated until each chain would normally extend at right angles to the shaft when the shafts are rotated, a tearing action takes place upon the bark, tending to strip the bark from the log.

Since, as previously mentioned, the bark tends to have higher longitudinal strength, the normal tendency of the operation of the device is to tear elongated strips of bark from the log. Also since, in many species of wood, such strips are sufficiently tough so that there is a tendency for them to become entangled in the mechanism, I provide a series of saws 34 at one or both ends of the shafts 22 to 26. These saws, without necessarily cutting into the wood of log 10, either partially or wholly, sever the section of bark into lengths sufficiently small so that they are easily discharged from the outer edges of the housing instead of becoming entangled with the rotating mechanism within the housing. The short length of bark fall out of the housing without entanglement and ordinarily drop to the ground in proper lengths to be easily disposed of.

On the end wall 18 of the housing, a gear case 36 is mounted. Upon a short shaft 38 is fixed a main driving gear 40. The main gear 40 drives directly a gear 46 mounted on the shaft 26 for operating the chains and saw mounted thereupon. In turn, the gear 46 drives a gear 42 mounted on the shaft 22 through a pinion 48. As indicated by the arrows, the main drive gear 40 rotates in a counterclockwise direction and the gear 46 rotates in a clockwise direction. The shaft 22 also rotates in a clockwise direction so that the chain on the shaft 22 acts inwardly and upwardly upon the bark that it strikes. In order that the chain on the shaft 24 will operate similarly, it is necessary that a gear 44 rotate in a counterclockwise direction. This is accomplished by inserting two pinions 50 between the gears 44 and 46, as shown.

While many forms of motive power are suitable for driving my debarking apparatus, I find it most convenient to employ the motor of a chain saw. The power plant of a power-driven chain saw has the advantage of ready availability in the localities where my invention will be used. If the apparatus is not to be used continuously, the power plant can be taken from a saw temporarily, while, if the debarking apparatus is to be used more extensively, a separate power plant can be obtained for use with it and the owner will have the advantage of being able to interchange it with other similar motors.

As shown in Figure 1, a bell 52 provided with a flange 54 is attached to the upper portion of the gear case 36. A motor has attached thereto a clutch housing 56 carrying a flange 58 for mating with the flange 54. When the two flanges are brought together, they are held in place by a clamp ring 60. The clamp ring is formed of upper and lower semicircular members 62 and 64, held together by a semi fixed bolt 66 and a toggle joint 68. When a handle 70, shown in Figure 2, is lifted, the ring 60 is loosened, permitting the lower portion of bolt 66 to be disengaged from the lower half 64 of ring 60. When the two halves 62 and 64 of the ring are separated, it may be removed, whereupon the motor end may be pulled horizontally away from the bark-stripping apparatus.

Although the clutch mechanism of the motor does not form a portion of my invention, and, even though the clutches of all chain-saw motors do not operate in the same way, the one illustrated herein is deemed to be typical. Mounted upon the outer end of the shaft 38 is a relatively deep, cup-shaped drum 72. Mounted upon the motor shaft, not designated, are a number of centrifugally extendible blocks 74. As the motor is started and picks up speed, the blocks 74 are pressed by centrifugal force against the inner surface of the drum 72 to transmit the power of the motor to the apparatus of my invention. Such an arrangement is quite useful in preventing overloading of the motor.

In order to permit the bark to be removed at the appropriate depth without undue attrition to the wood of the log itself, I have provided adjustable means for moving the apparatus across the face of the log. Secured to the lower part of end wall 16 and gear case 36 are two bent plates 76. The lower ends of plates 76 are formed into cylinders 78 to act as bearings for axles 80, each carrying a pair of wheels 82 for travel lengthwise of the log 10. The plates 76 are adjustably secured to the walls 16 and 36 by means of the bolts 84 which pass through vertical slots 86 in the plate 76. When the bolts 84 are loosened, the plates 76 may be moved upwardly or downwardly to allow for differences in thickness of bark and for wear on the ends of chains 30.

Obviously, the capacity for bark removing of my device is far less than that of the large installations costing many thousands of dollars but my device has the advantage of requiring but small investment and a lightness that permits its being carried to the job rather than requiring the logs to be carried to a central point. Compared to hand operations, it saves a great deal of effort and time. An additional economical feature is that it can be used with a gasoline motor that is already available to most woodsmen who find its use desirable.

I claim:

1. Portable debarking apparatus for movement across the surface of a log including a rotatable shaft, means for mounting the same, means for connecting the shaft to a source of power for rotating it, a plurality of flexible members secured to said shaft in dynamic symmetry, a circular saw on the same shaft with said flexible members for breaking up lengths of bark that have been dislodged by the flexible members and a housing extending above and to the sides of the members, and located beyond the path of rotation of the outer ends of the flexible members.

2. The apparatus of claim 1 wherein there are a pair of parallel shafts, each carrying flexible members and spaced sufficiently far to prevent interference between the flexible members on each shaft, the shafts being rotated in such directions that, when the flexible members move upwardly, they first move toward each other and then away from each other.

3. In a portable debarking device wherein bark is beaten off a log by free ends of flexible members secured to a rotating shaft, the improvement that includes a saw mounted upon the rotating shaft for rotation with the flexible elements, said saw being of lesser diameter than the diameter of each of the paths traveled by said free ends of said elements when said elements are fully extended by centrifugal force.

References Cited in the file of this patent

UNITED STATES PATENTS

| | | |
|---|---|---|
| 1,718,179 | Olson | June 18, 1929 |
| 2,599,962 | Williford | June 10, 1952 |
| 2,688,349 | Nicholson | Sept. 7, 1954 |
| 2,795,320 | Dillingham | June 11, 1957 |

FOREIGN PATENTS

| | | |
|---|---|---|
| 77,793 | Norway | Dec. 18, 1950 |
| 525,208 | Canada | May 22, 1956 |